United States Patent
Flanbaum

(10) Patent No.: US 6,568,660 B1
(45) Date of Patent: May 27, 2003

(54) POURER FOR SIMULTANEOUSLY POURING LIQUID FROM A CONTAINER AND MIXING AIR INTO THE LIQUID

(76) Inventor: Torben Flanbaum, Peder Lykkesvej 44, Copenhagen S (DK), DK-2300

(*) Notice: Subject to any disclaimer, the term of this patent is extended or adjusted under 35 U.S.C. 154(b) by 0 days.

(21) Appl. No.: 09/937,222

(22) PCT Filed: Mar. 21, 2000

(86) PCT No.: PCT/DK00/00135

§ 371 (c)(1),
(2), (4) Date: Sep. 24, 2001

(87) PCT Pub. No.: WO00/56620

PCT Pub. Date: Sep. 28, 2000

(30) Foreign Application Priority Data

Mar. 24, 1999 (DK) ........................ 1999 00399

(51) Int. Cl.[7] ................................. B01F 3/04
(52) U.S. Cl. ................... 261/76; 261/DIG. 75; 222/189.07; 222/189.09; 222/190
(58) Field of Search ............ 261/76, 77, DIG. 75; 222/189.07, 189.09, 190, 566

(56) References Cited

U.S. PATENT DOCUMENTS

| | | | |
|---|---|---|---|
| 1,548,956 A | * | 8/1925 | Rosenberg ............ 222/189.07 |
| 3,235,133 A | * | 2/1966 | Zimmerman et al. .. 222/189.07 |
| 3,881,656 A | * | 5/1975 | Markfelt et al. |
| 4,135,646 A | * | 1/1979 | Shaw |
| 5,799,836 A | * | 9/1998 | Lee .................. 222/189.07 |

FOREIGN PATENT DOCUMENTS

| | | |
|---|---|---|
| EP | 0860369 | 8/1998 |
| GB | 8229 | of 1894 |
| WO | 9205080 | 4/1992 |
| WO | 9513220 | 5/1995 |

* cited by examiner

Primary Examiner—C. Scott Bushey
(74) Attorney, Agent, or Firm—Wenderoth, Lind & Ponack, L.L.P.

(57) ABSTRACT

A pourer (101) for simultaneously pouring a liquid from a container and mixing air into the liquid. The pourer comprises an elongated annular body (102) which defines an outer surface having a part (103) which is adapted to be fitted into an opening of the container. The annular body defines a longitudinally extending through-going channel (104) and has an air intake opening (106) extending transversely to the channel and penetrating the body, so as to allow air to be sucked into the channel when liquid is flowing from the container through the channel. The channel defines a contraction (105) near the air intake opening, so as to generate a low pressure in the area of the contraction when liquid is flowing through the channel and thereby assist in sucking air into the channel through the air intake opening. A screen (107) with perforations (108) may be provided inside the channel (104).

9 Claims, 3 Drawing Sheets

POURER FOR SIMULTANEOUSLY POURING LIQUID FROM A CONTAINER AND MIXING AIR INTO THE LIQUID

TECHNICAL FIELD

The present invention relates to a pourer for simultaneously pouring liquid from a container and mixing air into the liquid. In particular, the pourer may be used for simultaneously pouring wine from a bottle and decanting the wine.

BACKGROUND OF THE INVENTION

Traditionally, wine is decanted by pouring wine from a bottle into a decanter, Typically, the decanter is placed on a table, and the wine is poured from a distance of approximately 10–20 cm above the top of the decanter, so as to oxide the wine on its way from the outlet of the bottle neck to the inlet of the decanter. A funnel comprising a filter arrangement for filtering lees or dregs from the wine is usually fitted on top of the decanter.

In order to facilitate pouring of wine out of the bottle and to prevent droplets of wine from being spilled when stopping or interrupting pouring, various wine pourers have been suggested in the prior art. One such wine pourer is known from Danish patent application No. 169 026.

Devices for controlling or dosing a liquid have also been suggested in the prior art. British patent No. 8229 dated 1894 shows an example of a pouring device for facilitating and controlling the pouring of liquids from bottles and like vessels. The device has a tube adapted to be secured in the mouth of a bottle and having a tapered discharging end to form a nozzle. The device further comprises a branch tube for admitting air to the bottle to which the device is applied, whereby when it is desired to stop the outflow of liquid, the mouth of the branch tube may be stopped by a finger, thereby preventing air from entering the bottle and consequently arresting the outflow of the liquid through the mouth of the tube.

SUMMARY OF THE INVENTION

It has been found that the prior art processes of mixing air into a liquid, in particular the above-mentioned process of decanting wine, are associated with difficulties. When pouring wine into the decanter, great attention is required in order not to spill wine when the wine is poured from a distance above the decanter. Moreover, usually the wine splashes when hitting the funnel/filter arrangement, the splashes thereby being likely to cause stains on a table on which the decanter is placed or on a table cloth covering the table. However, so far these drawbacks have been accepted as inevitable.

The inventive concept underlying the present invention is the provision of a pouring device capable of drawing air into the flow of liquid flowing through the device and mixing the air with the liquid within the device itself. Accordingly, a first aspect of the present invention relates to a pourer for simultaneously pouring a liquid from a container and mixing air into the liquid, comprising an elongated annular body defining an outer surface, at least part of which is adapted to be fitted into an opening of the container, the annular body defining a longitudinally extending through-going channel and having an air intake opening extending transversely to the channel and penetrating the body, so as to allow air to be sucked into the channel when liquid is flowing from the container through the channel, the channel defining a contraction near the air intake opening, so as to generate a low pressure in the area of the contraction when liquid is flowing through the channel and thereby assist in sucking air into the channel through the air intake opening.

The channel defining a contraction near the air intake opening is also referred to as a venturi-arrangement, wherein the flow velocity of liquid is increased in area of the contraction, thereby causing a pressure difference which is used for sucking air into the channel. The air intake is preferably arranged at a location in relation to the contraction substantially where the channel has its smallest cross-section. Immediately of the contraction, the channel preferably forms a diffuser-like increase in cross-section area.

When the pourer is used for wine, oxidation of the wine is achieved directly when pouring wine from, e.g., a bottle to a glass. Thereby, it is ensured that the wine keeps its full bouquet which, in a prior art decanting process, may be partly lost due to the fact that the wine is poured from the bottle to a decanter, and from the decanter to the glass. Moreover, the funnel/filter arrangement and the decanter which have been required for prior art decanting processes is no longer needed, thereby facilitating the decanting process and reducing the costs of equipment needed for a decanting process. Typically, the container is a wine bottle, the opening of the container being provided at the end of the bottle neck. The flow of liquid preferably occurs under the action of gravity when pouring liquid out of the container, e.g., when pouring wine out of a bottle.

Preferably, the pourer comprises means for mixing the liquid and the air and which may be defined in the channel downstream of the air intake opening. The means for mixing the liquid and the air may comprise one or more obstacles for the flow of liquid, arranged in the channel. Such obstacles may comprise a perforated screen extending across the channel and/or one or more lamellas. Perforations of varies sizes may be provided in order to obtain an improved mixing of air and liquid. A filter arrangement may further be provided, e.g., in the perforations of the screen.

At least the portion of the outer surface which is adapted to be fitted into the opening of the container may be conical, so that the annular body may be fitted into container openings of various diameters. At least part of the conical portion of the outer surface may be made from or coated with a soft material suitable of making up a seal at the opening of the container. Preferably, the soft material can be deformed to such an extent and/or has a surface friction which is sufficient to ensure that the annular body sticks to the container opening when gravity is acting on the body while pouring. The outer surface may further have a non-conical portion.

In order to prevent wine from being spilled when stopping pouring, the downstream end surface of the annular body may extend at an oblique angle in relation to the outer surface, so as to provide a sharp edge at the outlet end of the annular body. The outlet end of the annular body may be shaped so as to define a diffuser-like outlet of the channel, thereby further improving mixing of air into the liquid.

In a preferred embodiment, the pourer according of the invention has a conical end portion coated with a soft material for ensuring a seal between a wine bottle and the pourer. A contraction may be provided inside a tubular portion of the pourer, the contraction being formed as a venturi-system which causes an increase of the flow velocity, whereby air is sucked into the pourer through a hole in the venturi-pipe, so as to cause oxidation of the wine, a so-called decanting, the wine being divided by passing a strainer before it enters a funnel or diffuser.

The pourer may be a decanting pourer adapted to be arranged in the opening of a wine bottle, e.g., the neck of a wine bottle. The pourer may have a conical part and a tubular part, the outer surface of the conical part being coated with a soft material, so that the pourer may firmly seal at the bottle neck. The inner part of the conical part may have a tubular form, the tube having a contraction. The contraction may be provided with an opening for air-intake. The contraction and the air-intake may be arranged in relation to each other in such a way that, during pouring of wine, air is sucked into the pourer through the opening, when the velocity of the flow is increased due to the contraction. A filter may be provided inside the pourer where the conical part and the tubular part meet, the filter being arranged so as to assist in mixing the sucked air with the wine when the wine passes the filter. Lamellas may be provided inside the tubular part, the lamellas preferably being arranged in such a fashion that the flow direction of wine is forced to change when wine is poured.

In a second independent aspect, the present invention relates to a pourer for simultaneously pouring a liquid from a container and mixing air into the liquid, comprising an elongated annular body defining an outer surface, at least part of which is adapted to be fitted into an opening of the container, the annular body defining a through-going channel and having an air intake opening extending transversely to the channel and penetrating the body, so as to allow air to be sucked into the channel when liquid is flowing from the container through the channel, means for mixing the liquid and the air being defined in the channel downstream of the air intake opening.

The channel preferably defines a contraction near the air intake opening, so as to generate a low pressure in the area of the contraction when liquid is flowing through the channel and thereby assist in sucking air into the channel through the air intake opening.

Embodiments of the invention according to the second aspect may comprise any features described above in connection with the first aspect of the present invention.

DETAILED DESCRIPTION OF THE DRAWINGS

Figure 1:
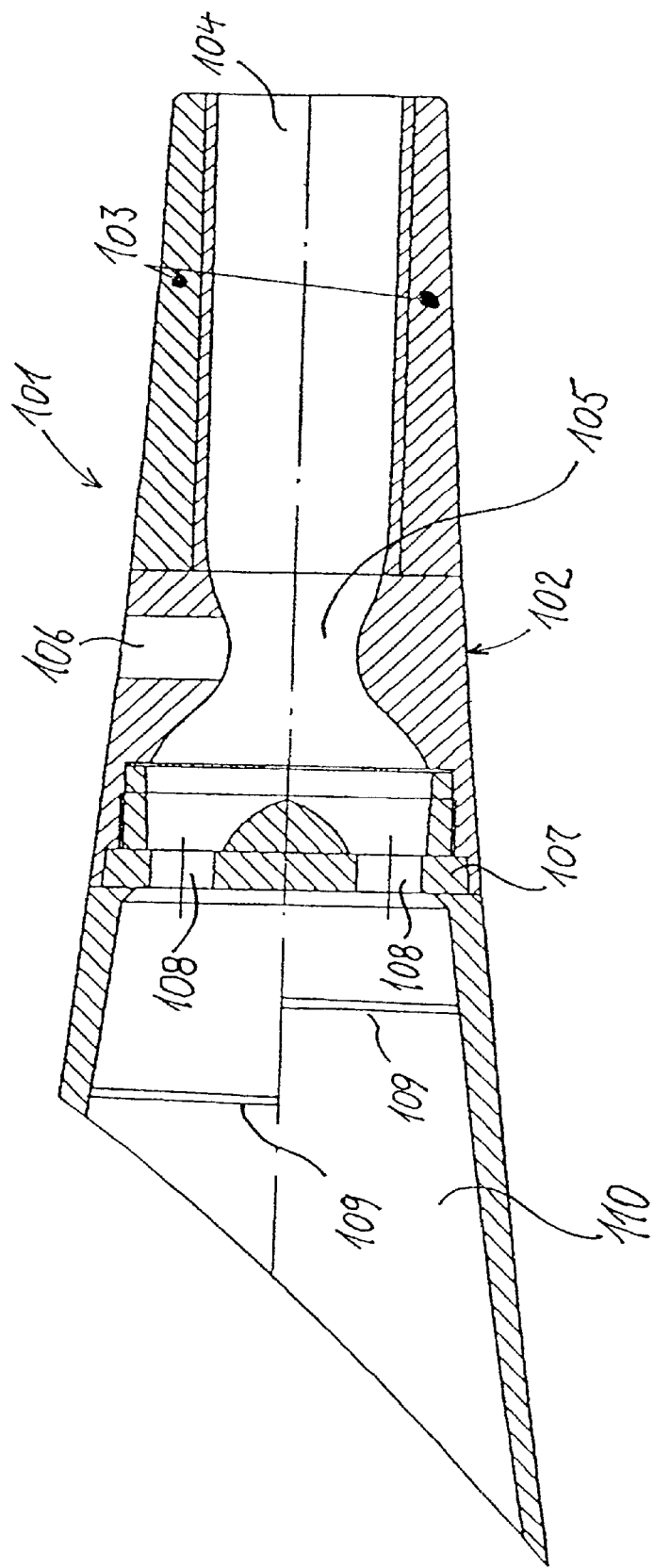
FIG. 1 is a cross-sectional illustration of a first embodiment of a pourer according to the invention.

FIG. 1 is a cross-sectional illustration of a first pourer 101 having an annular body 102 with a conical part 103 adapted to be fitted into the top opening of a bottle neck. The annular body 102 defines a through-going channel 104 with a venturi-like contraction 105, at which an air intake opening 106 is provided. A screen 107 with perforations 108 is provided inside the channel 104, the screen 107 or the perforations 108 optionally being provided with filtering means. Two lamellas 109 are provided in a diffuser-like end portion 110 of the channel 104.

Figure 2:
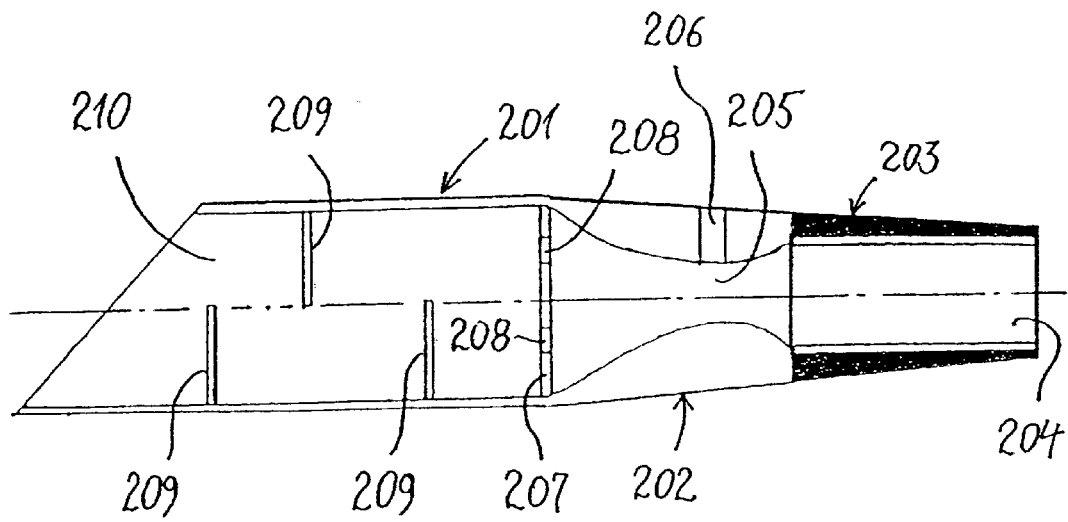
FIG. 2 is a schematic illustration of a second embodiment of a pourer according to the invention.

FIG. 2. is a schematic illustration of a second pourer 201 having an annular body 202 with a conical part 203 adapted to be fitted into the top opening of a bottle neck. The annular body 202 defines a through-going channel 204 with a venturi-like contraction 205, at which an air intake opening 206 is provided. A screen 207 with perforations 208 is provided inside the channel 204, the screen 207 or the perforations 208 optionally being provided with filtering means. Three lamellas 209 are provided in an end portion 210 of the channel 204.

Figure 3:
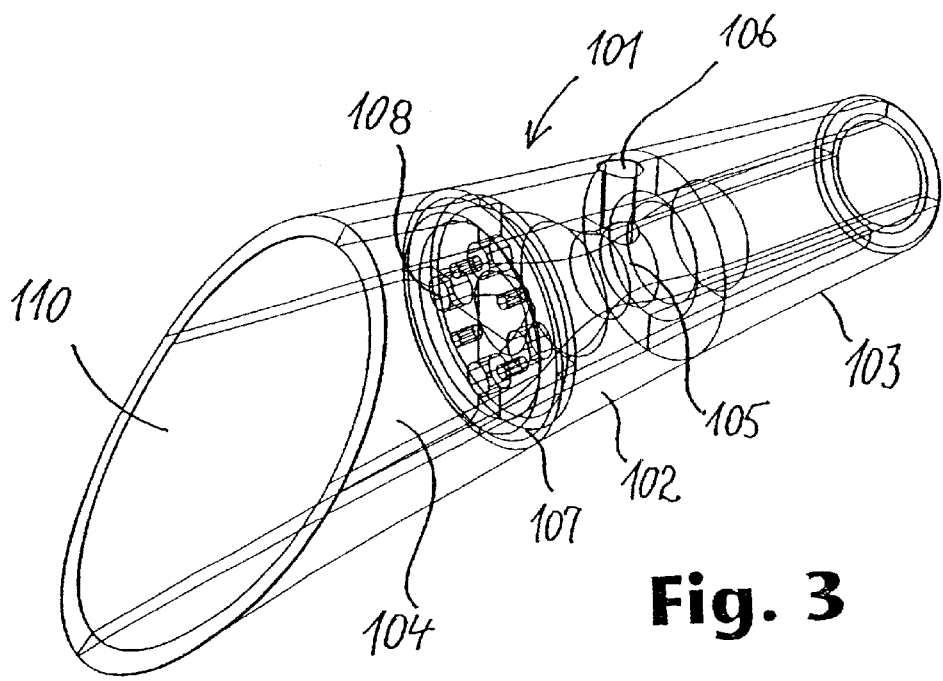
FIG. 3 is a three-dimensional sketch of a third embodiment of a pourer according to the invention.

FIG. 3 is a three-dimensional sketch of a third pourer 101, the only difference between the pourer of FIG. 3 and the pourer of FIG. 1 being that no lamellas are provided in the end portion 110 of the pourer of FIG. 3.

Figure 4:
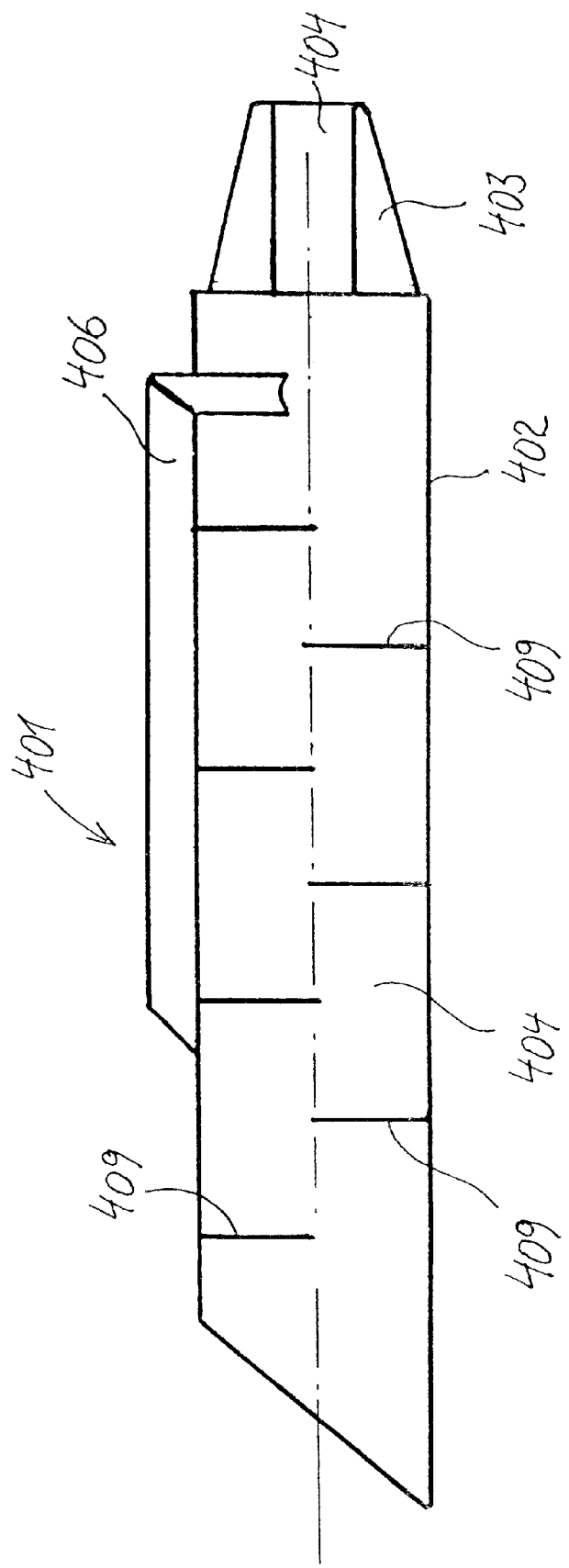
FIG. 4 is a schematic illustration of an embodiment of a pourer according to the second aspect of the invention.

FIG. 4 is a schematic illustration of a fourth pourer 401 having an annular body 402 with a conical part 403 adapted to be fitted into the top opening of a bottle neck. The annular body 402 defines a through-going channel 404 to which an air intake duct 406 is connected. A plurality of lamellas 409 are provided inside the channel 404.

What is claimed is:

1. A pourer for simultaneously pouring a liquid from a container and mixing air into the liquid, comprising an elongated annular body defining an outer surface, at least part of which is adapted to be fitted into an opening of the container, the annular body defining a longitudinally extending through-going channel and having an air intake opening extending transversely to the channel and penetrating the body, so as to allow air to be sucked into the channel when liquid is flowing from the container through the channel, the channel defining a contraction near the air intake opening, so as to generate a low pressure in the area of the contraction when liquid is flowing through the channel and thereby assist in sucking air into the channel through the air intake opening.

2. A pourer according to claim 1, wherein means for mixing the liquid and the air are defined in the channel downstream of the air intake opening.

3. A pourer according to claim 1, wherein at least the portion of the outer surface which is adapted to be fitted into the opening of the container is conical.

4. A pourer according to claim 3, wherein at least part of the conical portion of the outer surface is made from or coated with a soft material suitable of making up a seal at the opening of the container.

5. A pourer according to claim 1, wherein the outer surface has a non-conical portion.

6. A pourer according to claim 2, wherein the means for mixing the liquid and the air comprise a perforated screen extending across the channel.

7. A pourer according to claim 6, wherein perforations in the screen are provided with filters for filtering the liquid.

8. A pourer according to claim 2, wherein the means for mixing the liquid and the air comprise a plurality of lamellas arranged as obstacles to the flow of liquid.

9. A pourer according to claim 1, wherein the annular body defines a downstream end surface which defines a plane extending at an oblique angle in relation to the outer surface.

* * * * *